UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

BLUE-GRAY TO GREEN-GRAY VAT DYES.

1,169,404.     Specification of Letters Patent.     Patented Jan. 25, 1916.

No Drawing.     Application filed April 24, 1914.   Serial No. 834,148.

*To all whom it may concern:*

Be it known that I, MAX HENRY ISLER, citizen of the Swiss Republic, residing at Mannheim, Germany, have invented new and useful Improvements in Blue-Gray to Green-Gray Vat Dyes, of which the following is a specification.

I have discovered a new class of vat coloring matters of the anthracene series which dye cotton from blue-gray to green-gray shades of excellent fastness against the action of chlorin, and in addition possess the following characteristics. They consist when dry of dark violet-black powders which are insoluble in water and in dilute acids and alkalis, but are soluble in concentrated sulfuric acid giving dull violet solutions, are soluble in nitrobenzene giving blue-green to red-violet solutions, in quinolin giving green-blue to black-blue solutions. With alkali hydrosulfite they yield blue vats.

My new coloring matters can be obtained by treating nitro-, or amino-, derivatives of di-benzanthrone, (normal, or iso) which derivatives can be produced as described in the specifications of Letters Patents No. 796,393 and No. 1,063,000 with one of the following reactive chlorids, namely aluminium chlorid, antimony pentachlorid, phosphorous trichlorid and phosphorous pentachlorid, and I prefer to carry out the reaction in the presence of nitrobenzene.

The following examples will serve to illustrate how some of my new coloring matters can be obtained, but the invention is not confined to these examples. The parts are by weight.

Example 1: Heat together, for a few hours, at from 180–185° C. 100 parts of nitro-dibenzanthrone, from 500 to 1000 parts of nitrobenzene and 100 parts of aluminium chlorid, and then distil off the nitrobenzene, for example, by means of steam. The coloring matter so obtained can either be directly employed for dyeing, or it can be first dissolved in concentrated sulfuric acid and precipitated by means of water in order to obtain it in a state of fine division. It yields a dull violet solution in concentrated sulfuric acid, a red-violet solution in nitrobenzene and a black-blue solution in quinolin. The color of the hydrosulfite vat is blue and this vat colors cotton blue shades which, upon washing, are changed into fast bluish-gray shades. If in this example, the aluminium chlorid be replaced by the same quantity of antimony pentachlorid, preferably while increasing the quantity of nitrobenzene, a similar coloring matter is obtained.

Example 2: Treat 100 parts of amino-dibenzanthrone (obtainable, for instance, by reducing, with sodium sulfid, the nitro-dibenzanthrone used according to the foregoing example) with 500 to 2000 parts of nitrobenzene and 100 parts of aluminium chlorid, as described in the foregoing example. The coloring matter so obtained yields a dull violet solution in concentrated sulfuric acid, a blue-green solution in nitrobenzene and a green-blue solution in quinolin. With alkaline hydrosulfite it gives a blue vat which colors cotton blue shades which, upon washing, are converted into gray shades having a greenish tinge. If in this example, the aluminium chlorid be replaced by the same quantity of antimony pentachlorid, a similar coloring matter is obtained.

In either of the foregoing examples, the aluminium chlorid, or the antimony pentachlorid, can be replaced by either of the other chlorids mentioned.

Analogous coloring matters can be obtained from nitro-, and amino-, derivatives of iso-dibenzanthrone in manners similar to those hereinbefore described for treating the corresponding derivatives of dibenzanthrone.

Now what I claim is:—

1. The new coloring matters of the anthracene series which are derivatives of a dibenzanthrone and which consist when dry of dark violet-black powders, are insoluble in water and in dilute acids and alkalis, yield dull violet solutions in concentrated sulfuric acid, are soluble in nitrobenzene giving blue-green to red-violet solutions and in quinolin yielding green-blue to black-blue solutions and dissolve in alkaline hydrosulfite solution yielding blue vats which dye cotton from blue-gray to green-gray shades of excellent fastness against the action of chlorin.

2. The new coloring matter of the anthracene series which is a derivative of a dibenzanthrone and which consists when dry of a dark powder, is insoluble in water and in dilute acids and alkalis, yields a dull violet solution in concentrated sulfuric acid, a red violet solution in nitrobenzene, a black-blue solution in quinolin, and dissolves in alkaline hydrosulfite giving a blue vat which dyes cotton bluish-gray shades of excellent fastness against the action of chlorin.

In testimony whereof I have hereunto set my hand in the presence of two subscribing witnesses.

MAX HENRY ISLER.

Witnesses:
S. S. BERGER,
I. ALEC. LLOYD.